(12) United States Patent
Peng et al.

(10) Patent No.: US 12,655,239 B2
(45) Date of Patent: Jun. 16, 2026

(54) POLYOLEFIN COMPOSITIONS AND ARTICLES THEREOF

(71) Applicant: ExxonMobil Chemical Patents Inc., Baytown, TX (US)

(72) Inventors: Haiqing Peng, Sugar Land, TX (US); Jorge A. Guerra, Houston, TX (US); Danica L. Nguyen, Houston, TX (US); Shuhui Kang, Houston, TX (US); Trent J. Mouton, Humble, TX (US); Truyen T. Pham, Sugar Land, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 567 days.

(21) Appl. No.: 18/001,439

(22) PCT Filed: Jun. 10, 2021

(86) PCT No.: PCT/US2021/036790
§ 371 (c)(1),
(2) Date: Dec. 9, 2022

(87) PCT Pub. No.: WO2022/020025
PCT Pub. Date: Jan. 27, 2022

(65) Prior Publication Data
US 2023/0220136 A1 Jul. 13, 2023

Related U.S. Application Data

(60) Provisional application No. 63/055,033, filed on Jul. 22, 2020.

(51) Int. Cl.
| | |
|---|---|
| *C08F 210/16* | (2006.01) |
| *C08L 23/0807* | (2025.01) |
| *F16L 9/12* | (2006.01) |

(52) U.S. Cl.
CPC ........ *C08F 210/16* (2013.01); *C08L 23/0815* (2013.01); *F16L 9/12* (2013.01); *C08F 2800/20* (2013.01)

(58) Field of Classification Search
CPC .................................................. C08L 23/0815
See application file for complete search history.

(56) References Cited

U.S. PATENT DOCUMENTS

| | | | |
|---|---|---|---|
| 6,185,349 | B1 | 2/2001 | Dammert et al. |
| 6,562,905 | B1 | 5/2003 | Nummila-Pakarinen et al. |
| 6,946,521 | B2 | 9/2005 | Miserque et al. |
| 7,037,977 | B2 | 5/2006 | Miserque et al. |
| 7,696,280 | B2 | 4/2010 | Krishnaswamy et al. |
| 10,047,176 | B2 | 8/2018 | Meier et al. |
| 2001/0014724 | A1 | 8/2001 | Promel et al. |
| 2004/0157988 | A1 | 8/2004 | Miserque et al. |
| 2009/0283939 | A1* | 11/2009 | Turner .................... C08L 23/06 525/240 |
| 2014/0256901 | A1* | 9/2014 | Sukhadia ............ C08L 23/0815 526/348.3 |
| 2015/0274947 | A1 | 10/2015 | Vittorias et al. |
| 2019/0119417 | A1 | 4/2019 | Li et al. |
| 2019/0248991 | A1 | 8/2019 | Suchao-In et al. |
| 2019/0284315 | A1 | 9/2019 | Rohatgi et al. |
| 2021/0155783 | A1 | 5/2021 | Hildebrandt et al. |

FOREIGN PATENT DOCUMENTS

| | | | |
|---|---|---|---|
| EP | 3293208 | B1 | 6/2021 |

* cited by examiner

*Primary Examiner* — Irina Krylova
(74) *Attorney, Agent, or Firm* — C. Tumey Law Group PLLC

(57) ABSTRACT

In some embodiments, a polyethylene composition includes has 80 wt % to 99.9 wt % ethylene content and 20 wt % to 0.1 wt % a C3 to C40 α-olefin comonomer content, based on ethylene content plus comonomer content. The composition has a Mw/Mn of 15 to 45, a density of 0.93 g/cm³ to 0.97 g/cm³, a complex viscosity (at 628 rad/s, 190° C.) of 600 Pa*s or less, a zero shear viscosity by Cross model of 150,000 Pa*s to 350,000 Pa*s. It may also have a V index of less than 7. In some embodiments, an article includes the polyethylene composition. In some embodiments, the article is a pipe.

13 Claims, 3 Drawing Sheets

POLYOLEFIN COMPOSITIONS AND ARTICLES THEREOF

CROSS-REFERENCE OF RELATED APPLICATIONS

This application is a National Phase Application claiming priority to PCT Application Serial No. PCT/US2021/036790, filed Jun. 10, 2021, which claims the benefit of U.S. Provisional Application 63/055,033 filed Jul. 22, 2020, entitled "Polyolefin Compositions And Articles Therefrom", the entireties of which are incorporated by reference herein.

FIELD

The present disclosure relates to polyolefin compositions and articles including the polyolefin compositions.

BACKGROUND

Polyolefins, such as polyethylenes, having high molecular weight generally have improved mechanical properties over their lower molecular weight counterparts. However, high molecular weight polyolefins can be difficult to process and costly to produce. Polyolefins with lower molecular weights generally have improved processing properties. Polyolefins having a bimodal or broad molecular weight distribution, having a high molecular weight fraction (HMWF) and a low molecular weight fraction (LMWF), may be desirable because they can combine the advantageous mechanical properties of the HMWF with the improved processing properties of the LMWF.

It may be desirable to be able to produce multimodal and/or broad molecular weight distribution (MWD) polyolefins, such as multimodal high density polyethylene (HDPE) compositions, for applications including film, pressure pipe, corrugated pipe, and blow molding. Higher density is beneficial to mechanical strength to hold the internal pressure of a pipe, but impacts stress crack resistance negatively. In addition, multimodal and/or broad MWD polyolefins ideally should have excellent processability, as evidenced by high melt strength and extrusion high specific throughput with low head pressure, as well as good mechanical properties. Stress crack resistance (SCR), demonstrated by good performance in the Environmental Stress Crack Resistance (ESCR) and Notched Constant Ligament-Stress (NCLS) tests, is particularly important for HDPE-based pipe applications and recent industry specifications, e.g., ISO PE 100, are stringent in this respect. Strong SCR performance reduces the possibility of a pipe or blow molded article failing mechanically or structurally over the course of its lifetime. Additionally, strong SCR performance can provide lightweight blow molded articles (e.g., drums, containers, fuel tanks) and downgauge films, reducing material consumption and yielding significant cost savings.

Recent efforts to achieve the aforementioned property balance in multimodal HDPE compositions have involved attempts to make polymers with a Broad Orthogonal Composition Distribution (BOCD), where most or all of the comonomer is incorporated in the HMWF. BOCD is thought to enhance the formation of tie chains in the HMWF, leading to improved stiffness, toughness, and SCR. Conventional attempts to make multimodal HDPE compositions have used one of two approaches: 1) multiple reactors in series or parallel, typically with Ziegler-Natta catalyst systems, or 2) post-reactor melt blending. It is difficult and costly to obtain a completely homogenized blend with either approach, and lack of homogenization is detrimental to polymer properties. In addition, polymers made with Ziegler Natta catalysts provide compositions having a distribution that is broad but the high molecular weight fractions are higher density (e.g., less comonomer) than the lower molecular weight fraction (having high comonomer incorporation). In recent years, there have been some reports of achieving BOCD by using mixed catalyst in a single reactor in lower density ranges.

There is a need for new polyolefin compositions, such as multimodal high density polyethylenes.

In this regard, references of potential interest include: EP 3293208 A1; EP 3176213 A1; EP 1330490 B1; US 2001/0014724 A1; EP 2275483 B1; U.S. Pat. Nos. 6,562,905 B1; 6,185,349 B1; US 2019/0119417 A1; U.S. Pat. Nos. 6,946,521 B1; 7,696,280 B1; 7,037,977 B1; 10,047,176 B1.

SUMMARY

The present disclosure relates to polyolefin compositions and articles including the polyolefin compositions.

In some embodiments, a polyethylene composition includes 80 wt % to 99.9 wt % ethylene-derived content or units, and 20 wt % to 0.1 wt % of content or units derived from a $C_3$ to $C_{40}$ $\alpha$-olefin comonomer, said wt % values based on ethylene-derived content plus comonomer-derived content. The composition has Mw/Mn of 15 to 45, a density of 0.93 $g/cm^3$ to 0.97 $g/cm^3$, a complex viscosity (at 628 rad/s, 190° C.) of 600 Pa*s or less, a Cross model zero shear viscosity of 150,000 Pa*s to 350,000 Pa*s, and a V index of less than 7.

In some embodiments, an article includes or is made from the polyethylene composition. In particular embodiments, the article may be a pipe.

DETAILED DESCRIPTION

Figure 1:
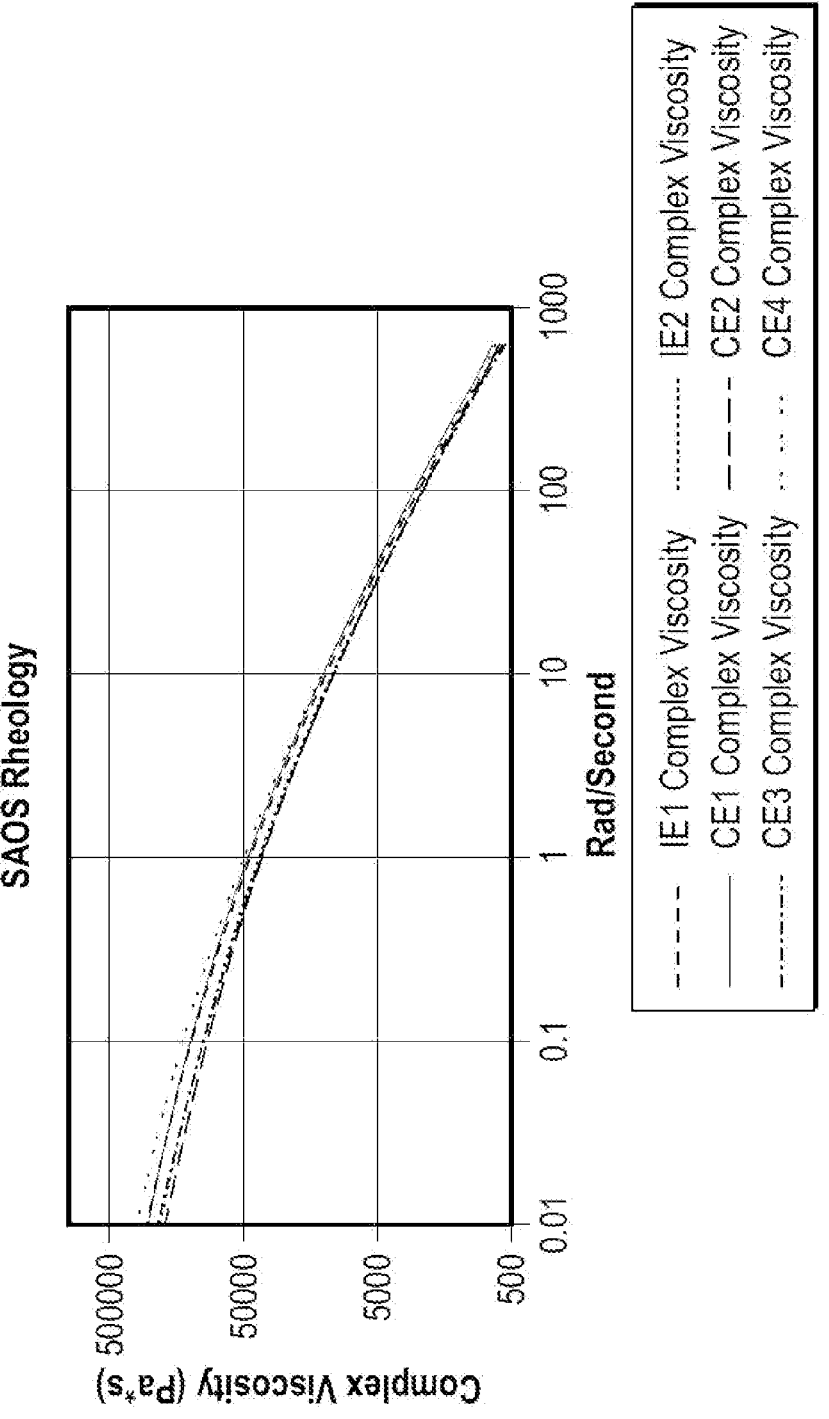
FIG. 1 is a graph illustrating SAOS rheology data for comparative examples CE1-CE4 and inventive examples IE1-IE3.

The present disclosure relates to polyolefin compositions and articles including the polyolefin compositions.

In some embodiments, a polyethylene composition includes 80 wt % to 99.9 wt % ethylene content and 20 wt % to 0.1 wt % a $C_3$ to $C_{40}$ $\alpha$-olefin comonomer content, based on ethylene content plus comonomer content. The composition has an Mw/Mn of 15 to 45 (preferably 20 or 25 to 45), a density of 0.93 $g/cm^3$ to 0.97 $g/cm^3$, a complex viscosity (at 628 rad/s, 190° C.) of 600 Pa*s or less, a Cross model zero shear viscosity of 150,000 Pa*s to 350,000 Pa*s, and a V index of less than 7. In some embodiments, an article includes the polyethylene composition. In some embodiments, the article is a pipe.

Polyethylene compositions of the present disclosure provide an improved combination of processing and mechanical properties over conventional polymers. For example, polyethylene compositions of the present disclosure can provide improved complex viscosity, K factor, and V index, as compared to conventional HDPEs. In addition, polyethylene compositions of the present disclosure can exhibit excellent SCR, demonstrated by, for example, NCLS test performance. These properties make the compositions particularly useful for film, pipe, and blow molding applications and can provide lightweight of such articles, reducing material consumption and costs.

Advantageously, the polyethylene compositions of the present disclosure can be made in situ in a single reactor or in series, such as one or more gas phase, slurry, or solution phase reactor. By "in situ" herein, it is meant that there has been no post-reactor blending, vulcanization, or the like, but rather the polymer is formed from the polymerization process itself.

The term "polyethylene" refers to a polymer having at least 50 wt % ethylene-derived units, such as at least 70 wt % ethylene-derived units, such as at least 80 wt % ethylene-derived units, such as at least 90 wt % ethylene-derived units, or at least 95 wt % ethylene-derived units, or 100 wt % ethylene-derived units. The polyethylene can thus be a homopolymer or a copolymer, including a terpolymer, having one or more other monomeric units. A polyethylene described herein can, for example, include at least one or more other olefin(s) and/or comonomer(s).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 50 wt % to 55 wt %, it is understood that the mer unit in the copolymer is derived from ethylene in the polymerization reaction and said derived units are present at 50 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. Accordingly, the definition of copolymer, as used herein, includes terpolymers and the like. "Different" as used to refer to mer units indicates that the mer units differ from each other by at least one atom or are different isomerically.

The term "alpha-olefin" or "α-olefin" refers to an olefin having a terminal carbon-to-carbon double bond in the structure thereof $R^1R^2C=CH_2$, where $R^1$ and $R^2$ can be independently hydrogen or any hydrocarbyl group; such as $R^1$ is hydrogen and $R^2$ is an alkyl group. A "linear alpha-olefin" is an alpha-olefin wherein $R^1$ is hydrogen and $R^2$ is hydrogen or a linear alkyl group.

For the purposes of the present disclosure, ethylene shall be considered an α-olefin.

When a polymer or copolymer is referred to herein as comprising an alpha-olefin (or α-olefin), including, but not limited to ethylene, 1-butene, and 1-hexene, the olefin present in such polymer or copolymer is the polymerized form of the olefin. For example, when a polymer is said to have an "ethylene content" or "ethylene monomer content" of 80 to 99.9 wt %, or to comprise "ethylene-derived units" at 80 to 99.9 wt %, it is understood that the mer unit in the copolymer is derived from ethylene in the polymerization reaction and said derived units are present at 80 to 99.9 wt %, based upon the weight of ethylene content plus comonomer content.

As used herein, and unless otherwise specified, the term "Cn" means hydrocarbon(s) having n carbon atom(s) per molecule, wherein n is a positive integer.

Polyolefin Products

In at least one embodiment, a process described herein produces polyethylene compositions including homopolymers and/or copolymers of one, two, three, four or more $C_2$ to $C_{40}$ olefin monomers, for example, $C_2$ to $C_{20}$ α-olefin monomers.

For example, the polyethylene compositions may include copolymers of a $C_2$ to $C_{40}$ olefin and one, two or three or more different $C_2$ to $C_{40}$ olefins, (where the $C_2$ to $C_{40}$ olefins can be $C_3$ to $C_{20}$ olefins, such as $C_3$ to $C_{12}$ α-olefin, such as propylene, butene, hexene, octene, decene, dodecene, preferably propylene, butene, hexene, octene, or a mixture thereof).

A polyethylene composition may comprise from 99.9 to 80 wt %, 99.9 to 85 wt %, 99.9 to 87.5 wt %, 99.9 to 90 wt %, 99.9 to 92.5 wt %, 99.9 to 95 wt %, 99.9 to 98 wt %, 99.5 to 98.5 wt %, or 99.2 to 98.8 wt % of polymer units derived from ethylene and 0.1 to 20 wt %, 0.1 to 10 wt %, 0.1 to 5 wt %, 0.1 to 2 wt %, 0.1 to 1.5 wt %, 0.5 to 1.5 wt %, or 0.8 to 1.4 wt % of polymer units derived from one or more $C_3$ to $C_{20}$ α-olefin comonomers, such as $C_3$ to $C_{10}$ α-olefins, such as $C_4$ to $C_8$ α-olefins, such as butene, hexene and octene. Comonomer content may be useful, e.g., for obtaining a desired density. In at least one embodiment, a comonomer is butene. The α-olefin comonomer may be linear or branched, and two or more comonomers may be used, if desired.

Suitable comonomers include α-olefins, such as $C_3$-$C_{20}$ α-olefins or $C_3$-$C_{12}$ α-olefins. The α-olefin comonomer can be linear or branched, and two or more comonomers can be used, if desired. Examples of suitable comonomers include linear $C_3$-$C_{12}$ α-olefins, and α-olefins having one or more $C_1$-$C_3$ alkyl branches, or an aryl group. Specific examples include propylene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. In some embodiments, comonomers include propylene, 1-butene, 1-pentene, 4-methyl-1-pentene, 1-hexene, 1-octene and styrene.

In a class of embodiments, the one or more olefin monomers may comprise $C_2$-$C_{12}$ olefin monomers. In another class of embodiments, the one or more olefin monomers may comprise ethylene and a $C_3$-$C_8$ α-olefin monomer, such as a $C_4$, $C_6$ and/or $C_8$ α-olefin monomer.

In at least one embodiment, a polyethylene composition has a weight average molecular weight (Mw) of 40,000 g/mol to 1,500,000 g/mol, such as 180,000 g/mol to 1,000,000 g/mol, such as 200,000 g/mol to 600,000 g/mol, such as 250,000 g/mol to 400,000 g/mol, such as 280,000 g/mol to 350,000 g/mol, such as 290,000 g/mol to 325,000 g/mol, such as 300,000 g/mol to 320,000 g/mol. In various embodiments, Mw is also contemplated to be within any of the foregoing low ends to any of the foregoing high ends. In at least one embodiment, a polyethylene composition has a number average molecular weight (Mn) of 3,000 g/mol to 100,000 g/mol, such as 5,000 g/mol to 75,000 g/mol, such as 7,000 g/mol to 50,000 g/mol, such as 7,000 g/mol to 25,000 g/mol, such as 10,000 g/mol to 20,000 g/mol, such as 10,000 g/mol to 15,000 g/mol. As with Mw, in various embodiments, Mn is also contemplated to be within any of the foregoing low ends to any of the foregoing high ends. In at least one embodiment, a polyethylene composition has an Mw/Mn value (also referred to as polydispersity) of 15 to 45, such as 20 to 45, or 20 to 40, such as 25 to 35, such as 26 to 32, such as 27 to 30, alternatively 30 to 32 (again, with various other embodiments including Mw/Mn within a range from any of the foregoing low ends to any of the foregoing high ends, provided the high end is greater than the low end). It is believed that polyethylene compositions of particular embodiments exhibiting relatively high Mw/Mn values may provide particular advantages (e.g., better processing) while still maintaining excellent properties such as stress crack resistance, a unique and beneficial feature of such polyethylene compositions. Accordingly, in particular embodiments, Mw/Mn may be within the range from a low of 20, 22, 25, 27, 28, 29, or 30 to a high of 32, 33, 34, 35, 40, or 45, with ranges from any of the foregoing low ends to any of the foregoing high ends contemplated.

A polyethylene composition can have a Z-average molecular weight (Mz) of 1,000,000 g/mol to 3,000,000 g/mol, such as 1,500,000 g/mol to 2,500,000 g/mol, such as 1,750,000 g/mol to 2,225,000 g/mol, such as 1,750,000 g/mol to 2,000,000 g/mol, such as 1,800,000 g/mol to 1,960,000 g/mol (with various embodiments including Mz within a range from any of the foregoing low ends to any of the foregoing high ends).

A polyethylene composition can have a ratio of Mz/Mw value of at least 5.5, such as at least 6. For example, an ethylene polymer can have an Mz/Mw value of from 5 to 12, such as from 5, 5.5, 6, or 6.5 to 6.5, 7, 7.5, or 8.

A polyethylene composition can have a g' value (also referred to as g'vis or branching index) of 0.9 or less, such as 0.8 or less, such of 0.6 to 0.8, such as 0.65, 0.7, or 0.71 to 0.75 or 0.76 (e.g., 0.7 to 0.75 or 0.71 to 0.76).

The distribution and the moments of molecular weight (Mw, Mn, Mw/Mn, etc.), the comonomer content and the long chain branching indices (g') are determined by using a high temperature Gel Permeation Chromatography (Polymer Char GPC-IR) equipped with a multiple-channel band-filter based Infrared detector IRS, an 18-angle light scattering detector and a viscometer. Three Agilent PLgel 10 μm Mixed-B LS columns are used to provide polymer separation. Detailed analytical principles and methods are described in paragraphs [0044]-[0059] of PCT Publication WO2019246069A1, which are herein incorporated by reference. Unless specially mentioned, all the molecular weight moments used or mentioned in the present disclosure are determined according to the conventional molecular weight (IR MW) determination methods (e.g., as referenced in Paragraph [0044] of the just-noted publication). The Mark-Houwink parameters needed are calculated from the empirical formula described in the above references according to the comonomer type and contents.

A polyethylene composition can have a density of 0.93 to 0.97 g/cm$^3$, such as 0.938 to 0.965 g/cm$^3$. For example, ethylene polymers may have a density from 0.938, 0.940, 0.945, or 0.950 to 0.95, 0.955, 0.960 or 0.965 g/cm$^3$, with ranges of various embodiments including any combination of any upper or lower value disclosed herein. Density herein is measured according to ASTM D1505-10 using a density-gradient column on a compression-molded specimen that has been slowly cooled to room temperature (i.e., over a period of 10 minutes or more) and allowed to age for a sufficient time that the density is constant within +/−0.001 g/cm$^3$. Compression molded specimens for density measurements are made according to ASTM D4703-10a. Unless otherwise indicated, the specimens are typically made from pelleted polymers and conditioned for 40 hours at 23° C. before the density measurement. In the case of specimens made from reactor granule samples, an accelerated conditioning of 15 mins at 23° C. is used.

A polyethylene composition can have a melt index (MI, also referred to as I2 or I2.16 in recognition of the 2.16 kg loading used in the test) of 0.01 to 50 g/10 min, such as from 0.01, 0.02, 0.03, 0.05, or 0.07 g/10 min to 0.1, 0.3, 0.5, 1, 10, 15, 20, or 30 g/10 min, including any combination of any upper or lower value disclosed herein. A polyethylene composition can have a high load melt index (HLMI) (also referred to as I21 or I21.6 in recognition of the 21.6 kg loading used in the test) of 0.01 to 100 g/10 min, such as from 0.01, 0.5, 1, 2, 4, 6, 7, or 8 g/10 min to 8, 9, 10, 12, 15, 20, 30, 50, 70, or 100 g/10 min, including any combination of any upper or lower value disclosed herein. Melt index (2.16 kg) and high-load melt index (HLMI, 21.6 kg) values are determined at 190° C. according to ASTM D1238 procedure B, such as by using a Gottfert MI-2 series melt flow indexer.

A polyethylene composition can have a melt index ratio (MIR, defined as I21.6/I12.16) of 100 to 200, such as 130 to 185, such as 135 to 155, such as 135 to 145, alternatively 155 to 185, alternatively 150 to 160, alternatively 175 to 185; with various embodiments including MIR ranges from any one of the foregoing low ends to any one of the foregoing high ends (provided the high end is greater than the low end).

A polyethylene composition can have a multimodal molecular weight distribution or a very broad molecular weight distribution, determined by Gel Permeation Chromotography (GPC) as described further below. A polyethylene composition may exhibit at least two inflection points in a GPC trace, an inflection point being the point where the second derivative of the curve changes in sign (e.g., from negative to positive or vice versa). A polyethylene composition may also exhibit at least three inflection points in a GPC trace.

A polyethylene composition can have a complex viscosity (at 628 rad/s, 190° C.) of 600 Pa*s or less, such as 500 Pa*s to 600 Pa*s, such as 525 Pa*s to 575 Pa*s, alternatively 575 Pa*s to 600 Pa*s, alternatively 550 Pa*s to 580 Pa*s. It is believed that particularly advantageous embodiments include these relatively low complex viscosities at 628 rad/s, while also having relatively higher Mw values. Advantageously, such combination may help the polyethylene compositions of such embodiments to have better strength and physical properties, while still being relatively easy to process (as indicated by the low viscosity values).

Likewise, a polyethylene composition in accordance with various embodiments can have a Cross model zero shear viscosity of 150,000 Pa*s to 350,000 Pa*s, such as 180,000 Pa*s to 300,000 Pa*s, such as 200,000 Pa*s to 275,000 Pa*s, such as 200,000 Pa*s to 225,000 Pa*s, alternatively 250,000 Pa*s to 275,000 Pa*s.

The complex viscosity (and Cross model zero shear viscosity) can be measured by dynamic frequency sweep (DFS) measurements. DFS measurements can be carried out in an ARES-G2 model rheometer (TA Instruments) using parallel plate geometry with a strain less than 3% and frequency range of 0.01 rad/s to 628 rad/s. The fundamental quantities obtained from the DFS test are the storage (G') and loss (G") dynamic moduli. The complex viscosity (and Cross model zero shear viscosity) is computed as described in more detail below.

Polyethylene compositions can have a Notched Constant Ligament-Stress (NCLS) value of greater than 800 hours, greater than 1,000 hours, or even greater than 1,500 hours. NCLS can be performed by following ASTM F2136, where the sheet is prepared by compressional molding per ASTM D4703. 800 psi stress is used.

Rheological data, such as complex viscosity and Cross model zero shear viscosity, can be determined using a TA Instruments model ARES-G2 rheometer via small amplitude oscillatory shear (SAOS) testing at 190° C. Testing specimens can be compression molded using a heated press at 190° C. The testing specimens can have a diameter of 25 mm and a thickness of about 2 mm. The specimens are loaded into the rheometer which has been preheated to 190° C. and are trimmed to a measurement gap of 1.5 mm. The loaded, trimmed specimen is equilibrated at the testing temperature of 190° C. for 5 minutes prior to testing. Testing angular frequency is from 0.01 to 628 rad/s, and oscillation strain is less than 3% strain during the test. Zero shear viscosity ($\eta_0$, also referred to as ZSV) can be obtained by using a Cross model based on the SAOS data under the Cox-Merz rule per the following formula, where $\eta$ is shear viscosity, $\eta_0$ is the zero shear viscosity (it may also be referred to as Newtonian viscosity, describing behavior of a constant viscosity not dependent on shear rate $\gamma$); $\eta_\infty$ is the infinite shear viscosity; k is the consistency; $\gamma$ is the shear rate used; and n is the power law index +1:

$$\frac{\eta - \eta_\infty}{\eta_0 - \eta_\infty} = \frac{1}{1 + (k\gamma)^n}$$

Zero shear viscosity can be determined by solving for 11 (shear viscosity) when $\gamma$ (shear) is set to 0. In at least one embodiment, a polyethylene composition has a zero shear viscosity of about 400,000 Pa*s or less, such as 200,000 Pa*s to 400,000 Pa*s, such as 200,000 Pa*s to 350,000 Pa*s, such as 250,000 Pa*s to about 350,000 Pa*s, such as 250,000 Pa*s to 300,000 Pa*s, alternatively 300,000 Pa*s to 350,000 Pa*s. Low ZSV may provide easier flow at low extrusion speed, even for high Mw compositions.

A polyethylene composition can have a K factor of 0.2 to 0.5, such as 0.25 to 0.45, such as 0.3 to 0.4, such as 0.3 to 0.35, alternatively 0.35 to 0.4. K factor is defined per the following equation:

$$K = g'F$$

where the g' is the branching index.

$$F = \frac{\Sigma|c_i(s_i - \bar{s})|}{\Sigma c_i} \text{ and } \bar{s} = \frac{\Sigma c_i s_i}{\Sigma c_i}$$

where the $c_i$ and $s_i$ are the polymer concentration and comonomer (e.g., $C_4$) percentage in each elution volume slice. Due to inaccuracy of comonomer measurement at both low and high MW end, the "F" is defined within MW of 5,000 and 3,000,000 Dalton.

A polyethylene composition can have a V index less than 7, such as from 4 to 7, such as 5 to 7, such as 6 to 6.8. V index correlates viscosity and Mw, and is defined by the following equation: V index=HLMI*ZSV/Mw, where Mw is weight average molecular weight, ZSV is Cross model zero shear viscosity, and HLMI is high load melt index (190° C., 21.6 kg), sometimes also referred to as $I_{21.6}$.

A polyethylene composition can have a yield strength (ASTM D-882, 15 mm width strip) of 15 MPa to 35 MPa, such as 20 MPa to 30 MPa, such as 22 MPa to 28 MPa, such as 24 MPa to 26 MPa. Yield strength of the polymer composition is resistance to yielding and, for pipes or other similarly-shaped articles formed from the composition, indicates how much hoop stress an article (e.g., pipe) is able to hold.

A polyethylene composition can have an elongation at yield (ASTM D-882, 15 mm width strip) of 1% to 20%, such as 5% to 15%, such as 7% to 12%, such as 8% to 10%.

A polyethylene composition can have a tensile strength of 20 MPa to 50 MPa, such as 30 MPa to 40 MPa, such as 32 MPa to 38 MPa, such as 34 MPa to 37 MPa. Tensile strength can be determined according to ASTM D638 using type IV tensile bar, which can be compression molded per ASTM D4703 and die cut. Testing speed is 2 inch/min. A polyethylene composition can have a flexural 2% secant modulus (ASTM D790-17 procedure B) of 800 MPa to 1300 MPa, such as 900 MPa to 1150 MPa, such as 950 MPa to 1100 MPa. Flexural secant modulus is indication of how easy the composition is to bend. Higher flexural secant modulus can go both ways, in that in some applications higher is better, whereas in other applications lower is better.

A polyethylene composition can have a maximum flexural stress (ASTM D790-17 procedure B) of 20 MPa to 40 MPa, such as 25 MPa to 35 MPa, such as 27 MPa to 31 MPa. Maximum flexural stress is the stress when the composition fails when being bent.

Notched Charpy Impact Strength: Charpy impact test, also known as the Charpy V-notch test, is a standardized high strain-rate test which determines the amount of energy absorbed by a material during fracture. The quantitative result of the impact tests the energy needed to fracture a material and can be used to measure the toughness of the material. The Notched Charpy impact strength is measured as per ISO 179-1/1eA, using equipment made by Empire Technologies Inc. In at least one embodiment, a composition of the present disclosure has a Notched Charpy impact strength at 23° C. of 10 kJ/m² or greater, such as 10 kJ/m² or 30 kJ/m², such as 15 kJ/m² to 30 kJ/m², 20 kJ/m² to 30 kJ/m², such as 20 kJ/m² to 25 kJ/m², such as 20 kJ/m² to 22 kJ/m².

In some embodiments, a polyethylene composition is a multimodal polyethylene composition such as a bimodal polyethylene composition. As used herein, "multimodal" means that there are at least two distinguishable peaks in a molecular weight distribution curve (as determined using gel permeation chromatography (GPC) or other recognized analytical technique) of a polyethylene composition. For example, if there are two distinguishable peaks in the molecular weight distribution curve such composition may be referred to as a bimodal composition. Typically, if there is only one peak (e.g., monomodal), no obvious valley between the peaks, either one of the peaks is not considered as a distinguishable peak, or both peaks are not considered as distinguishable peaks, then such a composition may be referred to as non-bimodal. For example, in U.S. Pat. Nos. 8,846,841 and 8,691,715, FIGS. 1-5 illustrate representative bimodal molecular weight distribution curves. In these FIGS., there is a valley between the peaks, and the peaks can be separated or deconvoluted. Often, a bimodal molecular weight distribution is characterized as having an identifiable high molecular weight component (or distribution) and an identifiable low molecular weight component (or distribution). In contrast, in U.S. Pat. Nos. 8,846,841 and 8,691,715, FIGS. 6-11 illustrate representative non-bimodal molecular weight distribution curves. These include unimodal molecular weight distributions as well as distribution curves containing two peaks that cannot be easily distinguished, separated, or deconvoluted.

Accordingly, a polyethylene composition according to various embodiments can have a low molecular weight fraction, LMWF, and a high molecular weight fraction, HMWF. For example, a polyethylene composition may comprise from 0.1 to 99.9 wt % of the HMWF, such as from 0.1, 1, 5, 10, 15, 20, 25, 30, 35, 40, 45, 50, 55, or 60 wt % to 12.5, 15, 20, 25, 30, 40, 45, 50, 55, 60 wt %, or 99.9 wt %, including any combination of any upper or lower value disclosed herein, based on the total of HMWF+LMWF where the total of HMWF+LMWF does not exceed 100%. Likewise, a polyethylene composition may comprise from 0.1 to 99.9 wt % of the LMWF, such as from 0.1, 1, 5, 10, 15, 20, 25, 30, 35, 40, 45, 50, 55, or 60 wt % to 12.5, 15, 20, 25, 30, 40, 45, 50, 55, 60 wt %, or 99.9 wt %, including any combination of any upper or lower value disclosed herein, based on the total of HMWF+LMWF where the total of HMWF+LMWF does not exceed 100%. In at least one embodiment, a polyethylene composition comprises 45 wt % to 55 wt % LMWF and 55 wt % to 45 wt % HMWF, such as from 49 wt % to 51 wt % LMWF and 51 wt % to 49 wt % HMWF, such as about 50 wt % LMWF and about 50 wt % HMWF.

As discussed below, many embodiments include polyethylene compositions made in multiple (2 or more, preferably 2 according to some embodiments) polymerization reactors in series. In particular of these embodiments, the LMWF is made in the first series reactor; then LMWF is introduced into the second series reactor, downstream of the first, to produce a polyethylene composition (comprising the HMWF formed in the second reactor in combination with the LMWF, e.g., that remains unreacted, present). For such embodiments, properties of the LMWF may be determined directly (e.g., by sampling some portion of polymer product taken from the first reactor, and/or isolated from the end product). The property or properties of the polyethylene composition can be likewise be determined directly.

Alternatively, in embodiments in which LMWF and HMWF are produced in parallel reactors and then post-reactor blended, properties of both the LMWF and HMWF (as well as the final post-blend polymer composition) can be determined directly.

It is therefore useful in accordance with some embodiments (in particular those involve polyethylene compositions made in two series reactors) to note relevant LMWF properties in addition to the final polyethylene composition, as additionally indicative of the characteristics of such final polyethylene composition.

For instance, an LMWF of a polyethylene composition in accordance with some embodiments can have a GPC average molecular weight distribution with a Mw value of from 10,000 g/mol to about 100,000 g/mol, a Mn value of from 3,000 g/mol to about 10,000 g/mol, a Mz value of from about 200,000 g/mol to about 800,000, Mw/Mn of from 4.0 to 12.0, and/or a density of from about 0.930 g/cm³ to about 0.980 g/cm³.

In at least one embodiment, an HMWF is an ethylene copolymer, such as an ethylene-butene copolymer, meaning that butene (or other $C_3$-$C_{40}$, preferably $C_3$-$C_{12}$, comonomer) is added to the second series reactor in embodiments wherein the polyethylene composition is made in series reactors.

The HMWF of an ethylene polymer of the present disclosure can have a Mw value of from about 100,000 g/mol to about 1,000,000 g/mol, Mn value of from about 30,000 g/mol to about 300,000 g/mol, Mz value of from about 200,000 to about 4,000,000, a PDI of from about 2.0 to about 8.0, and/or a density of from about 0.900 g/cm³ to about 0.930 g/cm³.

In some embodiments, an HMWF of a polyethylene composition has a lower density than an LMWF of the polyethylene composition. In other words, an LMWF of a polyethylene composition can have a higher density than an HMWF of the polyethylene composition.

Methods of Making Polyethylene Compositions

In some embodiments, a Ziegler-Natta. catalyst may be fed in staged reactors. Ethylene and optionally an α-Olefin comonomer (such as $C_3$-$C_{10}$ α-Olefin, such as 1-butene) may be used to adjust density of the resulting polyethylene composition. Gas phase reactors, slurry loop reactors, or CSTR in series or any combination thereof may be used to produce the polyethylene compositions. The HMWF may be produced in either the first or the second reactor. Likewise, the LMWF may be produced in either the first or the second reactor, where the LMWF is produced in a different reactor than the HMWF. Any suitable Ziegler-Natta catalyst can be used to produce the LMWF and/or the HMWF. In some particular embodiments, the LMWF is produced in the first series reactor, and the HMWF is produced in the second series reactor, downstream of the first.

In particular embodiments, a polyethylene composition is produced via two slurry tank or slurry loop reactors in series with a Ziegler-Natta catalyst. In at least one embodiment, a Ziegler-Natta catalyst is titanium chloride on a magnesium chloride support.

As a more specific example, in some embodiments, the LMWF is formed in a first reactor (of a series of reactors). LMWF, catalyst, unreacted monomer, diluent, and hydrogen are fed from the outlet of the first reactor to a flash tank where the hydrogen and unreacted monomer are removed. The LMWF granules containing active catalyst are fed from the flash tank into a second series reactor. Monomer and hydrogen, (optional comonomer), and solvent are added to the second reactor. No new catalyst is added to the second reactor. The series of reactors are operated in a continuous process. For example, at a time interval (e.g., once per hour), an amount (e.g., 25,000 lbs) of the LMWF obtained from the flash tank is fed into the second reactor, and an amount (e.g., 50,000 lbs) of final product (polyethylene composition) is removed from the second reactor. Some LMWF polymer might only stay in the second reactor for a short period of time (e.g., about 5 mins), and the LMWF has little time to grow into a larger fraction. Some LMWF may stay in the second reactor for a longer period of time (e.g., about 2 hours), and the active catalyst sites continue to grow to create the HMWF. In general, any suitable polymerization process may be employed to arrive at the polyethylene compositions according to various embodiments. For instance, EP 3,176,213 B1 and U.S. Pat. No. 10,047,176 describe cascading slurry loop polymerization reactors in series for production of bimodal HDPE; such processes in general are suitable for producing the presently disclosed polyethylene compositions, noting however that a particularly high pressure in the first series reactor (e.g., 8-9 bar) for producing the LMWF may be preferred in accordance with present embodiments. Furthermore, in the context of such series slurry loop polymerizations, hydrogen may be used in 1, 2, or more of the series reactors, e.g., to control molecular weight. According to particular embodiments herein, the first reactor (LMWF reactor in particular embodiments) may be provided with hydrogen at a feed hydrogen (Hz) to feed ethylene ($C_2H_4$) mol ratio within the range from 4.5, 4.6, or 4.7 to 5.0, 5.1, 5.2, or 5.3. The second reactor (HMWF reactor in particular embodiments) may be provided with hydrogen at a feed hydrogen to feed ethylene mol ratio within the range from 2, 3, or 4 to 4.5, 5, 5.5, 6, 6.5, or 7. Ranges from any low end of mol ratio to any high end of mol ratio are contemplated herein.

Other potentially suitable processes for series reaction are described, e.g., in U.S. Pat. No. 6,185,349, wherein the polymerization is described as a slurry loop polymerization followed by a gas-phase polymerization reaction in series, although it is noted in this regard that U.S. Pat. No. 6,185,349 describes substantially lower Hz feed into the LMWF ($1^{st}$ series) reactor than the embodiments contemplated herein (e.g., 200-800 moles $H_2$ per 1000 moles ethylene, or a mole ratio of 0.2 to 0.8). This in turn would lead to substantially higher MI for the LMWF of U.S. Pat. No. 6,185,349, which would necessitate a larger split (relative amount) of HMWF incorporated into the resultant bimodal polyethylene composition in order to achieve better performance and properties, which in turn would lead to the '349 Patent's resultant polyethylene composition having much greater zero shear viscosity as compared to polyethylene compositions in accordance with embodiments described herein.

After the polymerization process, the resulting slurry is separated from the diluent and dried. From there, the polymer is sent to the finishing section. Antioxidant and neutralizing additives may be added to the product as the granules are finished into a final pelletized form.

Polymerizations can be performed using a catalyst system including a Ziegler-Natta catalyst, a co-catalyst, and optionally a support material.

Alternatively, the LMWF and HMWF are formed in parallel reactors followed by blending the LMWF and HMWF in any suitable post-reactor blending process. Preferably, however, the LMWF and HMWF are formed in series reactors as described above.

Ziegler-Natta Catalysts

The catalyst, for example, may include any Ziegler-Natta (ZN) transition metal catalyst, such as those catalysts disclosed in Ziegler Catalysts 363-386 (G. Fink, R. Mulhaupt and H. H. Brintzinger, eds., Springer-Verlag 1995); or in EP 103 120; EP 102 503; EP 0 231 102; EP 0 703 246; RE 33,683; U.S. Pat. Nos. 4,302,565; 5,518,973; 5,525,678; 5,288,933; 5,290,745; 5,093,415 and 6,562,905. Other examples of ZN catalysts are discussed in U.S. Pat. Nos. 4,115,639; 4,077,904; 4,482,687; 4,564,605; 4,721,763; 4,879,359 and 4,960,741. In general, ZN catalysts include transition metal compounds from Groups 3 to 17, or Groups 4 to 12, or Groups 4 to 6 of the Periodic Table of Elements. As used herein, reference to the Periodic Table of the Elements and groups thereof is to the NEW NOTATION published in Hawley's Condensed Chemical Dictionary, Thirteenth Edition, John Wiley & Sons, Inc., (1997), unless reference is made to the Previous IUPAC form denoted with Roman numerals (also appearing in the same), or unless otherwise noted. Examples of such catalysts include those comprising Group 4, 5 or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

ZN catalysts may be represented by the formula: MRx, where M is a metal from Groups 3 to 17, such as Groups 4 to 6, such as Group 4, such as titanium; R is a halogen or a hydrocarbyloxy group; and x is the valence of the metal M. Non-limiting examples of R include alkoxy, phenoxy, bromide, chloride and fluoride.

In a class of embodiments, the ZN catalysts may include at least one titanium compound having the formula $Ti(OR)_a X_b$, wherein R is a substituted or unsubstituted hydrocarbyl group, such as a $C_1$ to $C_{25}$ aliphatic or aromatic group; X is selected from Cl, Br, I, and combinations thereof; a is selected from 0, 1 and 2; b is selected from 1, 2, 3, and 4; and a+b=3 or 4. As used herein, "hydrocarbyl" refers to a moiety comprising hydrogen and carbon atoms.

Non-limiting examples where M is titanium include $TiCl_3$, $TiCl_4$, $TiBr_4$, $Ti(OCH_3)Cl_3$, $Ti(OC_2H_5)_3Cl$, $Ti(C_2H_5)$ $Cl_3$, $Ti(OC_4H_9)_3Cl$, $Ti(OC_3H_7)_2Cl_2$, $Ti(OC_2H_5)_2Br_2$, $Ti(OC_6H_5)Cl_2$, $Ti(OCOCH_3)Cl_3$, $Ti(OCOC_6H_5)Cl_3$, $TiCl_3/3AlCl_3$, $Ti(OC_{12}H_{25})Cl_3$, and combinations thereof.

In a class of embodiments, the ZN catalysts may include at least one magnesium compound. The at least one magnesium compound may have the formula $MgX_2$, wherein X is selected from the group consisting of Cl, Br, I, and combinations thereof. The at least one magnesium compound may be selected from: $MgCl_2$, $MgBr_2$ and $MgI_2$. ZN catalysts based on magnesium/titanium electron-donor complexes are described in, for example, U.S. Pat. Nos. 4,302,565 and 4,302,566. ZN catalysts derived from Mg/Ti/Cl/THF are also contemplated.

In at least one embodiment, a ZN catalyst is titanium chloride on Magnesium chloride support. Further, a co-catalyst (also known as an activator or modifier, e.g., alkyl aluminum compounds) may be employed with the ZN catalyst in accordance with known polymerization catalyzation techniques, forming a catalyst system. The catalyst system may further be supported, also in accordance with known techniques. Commercial supports include the ES70 and ES757 family of silicas available from PQ Corporation, Malvern, Pa. Other commercial supports include Sylopol™ Silica Supports including 955 silica and 2408 silica available from Grace Catalyst Technologies, Columbia, Md.

Still other suitable ZN catalysts, and co-catalysts to be used therewith, are disclosed in U.S. Pat. Nos. 4,124,532; 4,302,565; 4,302,566; 4,376,062; 4,379,758; 5,066,737; 5,763,723; 5,849,655; 5,852,144; 5,854,164 and 5,869,585 and published EP-A2 0 416 815 A2 and EP-A1 0 420 436. Additional co-catalysts may be found in U.S. Pat. Nos. 3,221,002 and 5,093,415. Furthermore, examples of supporting a catalyst system are described in U.S. Pat. Nos. 4,701,432; 4,808,561; 4,912,075; 4,925,821; 4,937,217; 5,008,228; 5,238,892; 5,240,894; 5,332,706; 5,346,925; 5,422,325; 5,466,649; 5,466,766; 5,468,702; 5,529,965; 5,554,704; 5,629,253; 5,639,835; 5,625,015; 5,643,847; 5,665,665; 5,468,702; and 6,090,740; and PCT Publication Nos. WO 95/32995; WO 95/14044; WO 96/06187; and WO 97/02297.

Polymer Blends

In another embodiment, the polyethylene composition produced herein is combined with one or more additional polymers in a blend prior to being formed into a film, molded part, or other article. As used herein, a "blend" may refer to a dry or extruder blend of two or more different polymers, and in-reactor blends, including blends arising from the use of multi or mixed catalyst systems in a single reactor zone, and blends that result from the use of one or more catalysts in one or more reactors under the same or different conditions (e.g., a blend resulting from in series reactors (the same or different) each running under different conditions and/or with different catalysts).

Additional polymer(s) can include polyethylene, isotactic polypropylene, highly isotactic polypropylene, syndiotactic polypropylene, random copolymer of propylene and ethylene, and/or butene, and/or hexene, polybutene, ethylene vinyl acetate, low density polyethylene (LDPE), linear low density polyethylene (LLDPE), high density polyethylene (HDPE), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, ethylene propylene diene monomer (EPDM) polymer, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In some embodiments, the additional polymer or polymers is/are present in the above blends, at from 0.1 to 99 wt %, based upon the weight of the polymers in the blend, such as 0.1 to 60 wt %, such as 0.1 to 50 wt %, such as 1 wt % to 40 wt %, such as 1 to 30 wt %, such as 1 to 20 wt %, such as 1 to 10 wt %, with the remainder being the polyethylene composition in accordance with the above description.

The blends described above may be produced by mixing the polyethylene composition with one or more additional polymers (as just described above), by connecting reactors together in series to make reactor blends or by using more than one catalyst in the same reactor to produce multiple species of polymer. The polymers can also or instead be mixed together as a post-reactor blend, e.g., prior to being put into an extruder, or may be mixed in an extruder.

The blends may be formed using conventional equipment and processes, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives (e.g., described in more detail below) may be included in the blend, in one or more components of the blend, and/or in a product formed from the blend, such as a film, as desired. Such additives may include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); acid scavenger; anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Additives

A polyethylene composition of the present disclosure may include one or more additives. The additives may include reinforcing and non-reinforcing fillers, antioxidants, stabilizers, processing oils (or other solvent(s)), compatibilizing agents, lubricants (e.g., oleamide), antiblocking agents, anti-static agents, waxes, coupling agents for the fillers and/or pigment, pigments, flame retardants, or other processing aids, or combination(s) thereof.

A polyethylene composition of the present disclosure can include additives such that the additives (e.g., fillers present in a composition) have an average agglomerate size of less than 50 microns, such as less than 40 microns, such as less than 30 microns, such as less than 20 microns, such as less than 10 microns, such as less than 5 microns, such as less than 1 micron, such as less than 0.5 microns, such as less than 0.1 microns, based on a 1 cm×1 cm cross section of a ring polymer composition as observed using scanning electron microscopy.

In at least one embodiment, a polyethylene composition may include fillers and coloring agents. Exemplary materials include inorganic fillers such as calcium carbonate, clays, silica, talc, titanium dioxide or carbon black. Any suitable type of carbon black can be used, such as channel blacks, furnace blacks, thermal blacks, acetylene black, lamp black and the like.

In at least one embodiment, a polyethylene composition may include flame retardants, such as calcium carbonate, inorganic clays containing water of hydration such as aluminum trihydroxides ("ATH") or magnesium hydroxide.

In at least one embodiment, a polyethylene composition may include UV stabilizers, such as titanium dioxide or Tinuvin® XT-850. The UV stabilizers may be introduced into a roofing composition as part of a masterbatch. For example, UV stabilizer may be pre-blended into a masterbatch with a thermoplastic resin, such as polypropylene, or a polyethylene, such as linear low density polyethylene.

Still other additives may include antioxidant and/or thermal stabilizers. In at least one embodiment, processing and/or field thermal stabilizers may include IRGANOX® B-225 and/or IRGANOX® 1010 available from BASF.

In at least one embodiment, a polyethylene composition may include a polymeric processing additive. The processing additive may be a polymeric resin that has a very high melt flow index. These polymeric resins can include both linear and/or branched polymers that can have a melt flow rate that is about 500 dg/min or more, such as about 750 dg/min or more, such as about 1000 dg/min or more, such as about 1200 dg/min or more, such as about 1500 dg/min or more. Mixtures of various branched or various linear polymeric processing additives, as well as mixtures of both linear and branched polymeric processing additives, can be employed. Reference to polymeric processing additives can include both linear and branched additives unless otherwise specified. Linear polymeric processing additives can include polypropylene homopolymers, and branched polymeric processing additives can include diene-modified polypropylene polymers. Similar processing additives are disclosed in U.S. Pat. No. 6,451,915, which is incorporated herein by reference.

In some embodiments, fillers (such as calcium carbonate, clays, silica, talc, titanium dioxide, carbon black, a nucleating agent, mica, wood flour, and the like, and blends thereof, as well as inorganic and organic nanoscopic fillers) can be present in a polyethylene composition in an amount from about 0.1 wt % to about 10 wt %, such as from about 1 wt % to about 7 wt %, such as from about 2 wt % to about 5 wt %, based on the total weight of the polyethylene composition. The amount of filler that can be used can depend, at least in part, upon the type of filler and the amount of extender oil that is used.

In some embodiments, and when employed, the polyethylene composition can include a processing additive (e.g., a polymeric processing additive) in an amount of from about 0.1 wt % to about 20 wt % based on the total weight of the polyethylene composition.

Films

A polyethylene composition of the present disclosure can be useful in such forming operations as film, sheet, and fiber extrusion and co-extrusion as well as blow molding, injection molding, and rotary molding. Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, membranes, etc., in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

The polyethylene compositions may be formed into monolayer or multilayer films. These films may be formed by any of the conventional techniques including extrusion, co-extrusion, extrusion coating, lamination, blowing and casting. The film may be obtained by the flat film or tubular process which may be followed by orientation in a uniaxial direction or in two mutually perpendicular directions in the plane of the film. One or more of the layers of the film may be oriented in the transverse and/or longitudinal directions to the same or different extents. This orientation may occur before or after the individual layers are brought together. For example a polyethylene composition layer can be extrusion coated or laminated onto an oriented polypropylene layer or the polyethylene composition and polypropylene can be coextruded together into a film then oriented. Likewise, oriented polypropylene could be laminated to oriented polyethylene composition, or oriented polyethylene composition could be coated onto polypropylene then optionally the combination could be oriented even further.

Films include monolayer or multilayer films. Specific end use films include, for example, blown films, cast films, stretch films, stretch/cast films, stretch cling films, stretch handwrap films, machine stretch wrap, shrink films, shrink wrap films, greenhouse films, laminates, and laminate films. Exemplary films are prepared by any conventional technique known to those skilled in the art, such as for example, techniques utilized to prepare blown, extruded, and/or cast stretch and/or shrink films (including shrink-on-shrink applications).

In one embodiment, multilayer films (multiple-layer films) may be formed by any suitable method. The total thickness of multilayer films may vary based upon the application desired. A total film thickness of about 5-100 μm, more typically about 10-50 μm, is suitable for most applications. Those skilled in the art will appreciate that the thickness of individual layers for multilayer films may be adjusted based on desired end-use performance, polymer(s) employed, equipment capability, and other factors. The materials forming each layer may be coextruded through a coextrusion feedblock and die assembly to yield a film with two or more layers adhered together but differing in composition. Coextrusion can be adapted for use in both cast film or blown film processes. Exemplary multilayer films have at least two, at least three, or at least four layers. In one embodiment the multilayer films are composed of five to ten layers.

The films described above may be used as stretch and/or cling films. Stretch/cling films are used in various bundling, packaging and palletizing operations. To impart cling properties to, or improve the cling properties of a particular film, a number of well-known tackifying additives have been utilized. Common tackifying additives include polybutenes, terpene resins, alkali metal stearates and hydrogenated rosins and rosin esters. The cling properties of a film can also be modified by the well-known physical process referred to as corona discharge.

Molded and Extruded Products

A polyethylene composition may also be used to prepare molded products in a molding process, such as injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

Thermoforming is a process of forming at least one pliable plastic sheet into a desired shape. An embodiment of a thermoforming sequence is described, however, this should not be construed as limiting the thermoforming methods useful with the compositions of the present disclosure. First, an extrudate film of the composition (and any other layers or materials) is placed on a shuttle rack to hold it during heating. The shuttle rack indexes into the oven which pre-heats the film before forming. Once the film is heated, the shuttle rack indexes back to the forming tool. The film is then vacuumed onto the forming tool to hold it in place and the forming tool is closed. The forming tool can be either "male" or "female" type tools. The tool stays closed to cool the film and the tool is then opened. The shaped laminate is then removed from the tool. Thermoforming is accomplished by vacuum, positive air pressure, plug-assisted vacuum forming, or combinations and variations of these, once the sheet of material reaches thermoforming temperatures, typically of 140° C. to 185° C. or higher. A pre-stretched bubble step is used, especially on large parts, to improve material distribution. In one embodiment, an articulating rack lifts the heated laminate towards a male forming tool, assisted by the application of a vacuum from orifices in the male forming tool. Once the laminate is firmly formed about the male forming tool, the thermoformed shaped laminate is then cooled, typically by blowers. Plug-assisted forming is generally used for small, deep drawn parts. Plug material, design, and timing may be critical to optimization of the process. Plugs made from insulating foam avoid premature quenching of the plastic. The plug shape is usually similar to the mold cavity, but smaller and without part detail. A round plug bottom will usually promote even material distribution and uniform side-wall thickness. For a semicrystalline polymer, fast plug speeds generally provide the best material distribution in the part. The shaped laminate is then cooled in the mold. Sufficient cooling to maintain a mold temperature of 30° C. to 65° C. may be desirable. The part is below 90° C. to 100° C. before ejection in one embodiment. The shaped laminate is then trimmed of excess laminate material.

Blow molding is another suitable forming means, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING (Jacqueline I. Kroschwitz, ed., John Wiley & Sons 1990).

In yet another embodiment of the formation and shaping process, profile co-extrusion can be used. The profile coextrusion process parameters are as above for the blow molding process, except the die temperatures (dual zone top and bottom) are from 150° C. to 235° C., the feed blocks are from 90° C. to 250° C., and the water cooling tank temperatures are from 10° C. to 40° C.

One embodiment of an injection molding process is described as follows. The shaped laminate is placed into the injection molding tool. The mold is closed and the substrate material is injected into the mold. The substrate material has a melt temperature of 180° C. to 300° C. in one embodiment, and from 200° C. to 250° C. in another embodiment, and is injected into the mold at an injection speed of 2 and 10 seconds. After injection, the material is packed or held at a predetermined time and pressure to make the part dimensionally and aesthetically correct. Typical time periods are from 5 to 25 seconds and pressures from 1,000 kPa to 15,000 kPa. The mold is cooled between 10° C. and 70° C. to cool the substrate. The temperature will depend on the desired gloss and appearance. Typical cooling time is from 10 to 30 seconds, depending in part on the thickness. Finally, the mold is opened and the shaped composite article ejected.

Likewise, molded articles may be fabricated by injecting molten polymer blend into a mold that shapes and solidifies the molten polymer into desirable geometry and thickness of molded articles. A sheet may be made either by extruding a substantially flat profile from a die, onto a chill roll, or alternatively by calendering. Sheet will generally be considered to have a thickness of from 10 mils to 100 mils (254 μm to 2540 μm), although sheet may be substantially thicker.

Tubing or pipe may be obtained by profile extrusion for uses in medical, potable water, land drainage applications or the like. Tubing or pipe may be unvulcanized or vulcanized. Vulcanization can be performed using, for example, a peroxide or silane during extrusion of the pipe. The profile extrusion process involves the extrusion of molten polymer through a die. The extruded tubing or pipe is then solidified by chill water or cooling air into a continuous extruded article. The tubing may be of from 0.25, 0.30, 0.31, 0.35, 0.50, or 0.75 cm to 1.50, 2.00, 2.25, 2.50, 2.54, 2.55, or 2.60 cm in outside diameter, and have a wall thickness of from 200, 250, or 254 μm to 0.3, 0.4, 0.5, or 0.6 cm. The pipe will generally be in the range of from 2.00, 2.20, 2.25, 2.50, 2.54, 2.60, or 3.00 cm to 200, 225, 250, 254, or 260 cm in outside diameter, and have a wall thickness of from 0.5 cm to 15 cm.

Slow Crack Growth of a pipe measured by PENT test— Slow crack growth (SCG) under plane strain conditions as measured by the Pennsylvania Notched Test (PENT) test is carried out with the stress, of 2.4 MPa. The PENT test, ASTM specification F 1473, which was originally designed to measure the resistance to SCG in pipes, fittings, and resins for conveying gas, can be used to measure the resistance to SCG in polyethylene products generally. Thus, slow crack growth values may be reported herein as "SCG values" or may equivalently be reported as "PENT values" where measured by the PENT test. The resistance to SCG as measured by the PENT test in hours has been directly correlated with the lifetime of large scale gas pipe systems and is expected to be correlated with the lifetime of polyethylene piping systems generally. It is possible to specify a resistance to SCG of a polyethylene resin as measured by the PENT test which will satisfy the commercially desired lifetime of the product. For example, a gas pipe system that contains a polyethylene resin with a PENT value of 500 h or greater will qualify for higher design factor for the pressure pipe service. In at least one embodiment, a pipe comprising a polyethylene composition of the present disclosure can have a slow crack growth of 100 hours or greater, such as 300 hours or greater, such as 500 hours or greater, such as 1,000 hours or greater, such as 2,000 hours or greater, such as 2,500 hours or greater, such as 3,000 hours or greater, such as 3,500 hours or greater, and in some embodiments up to 5,000 hours. Accordingly, pipe comprising a polyethylene composition in accordance with various embodiments exhibits slow crack growth (measured by PENT test) within the range from 300, 500, 1,000, 2,000, 2,500, 3,000, or 3,500 hours, to 5,000 hours.

Pipe Long Term Hydrostatic Strength: Pipe Long Term Hydrostatic Strength (LTHS) is used to determine the long term strength in the circumferential, or hoop, direction of a pipe or tube. LTHS is defined as the tensile stress in the wall of the pipe or tube in the circumferential orientation due to internal hydrostatic pressure that can be applied continuously with a high degree of certainty that failure of the pipe or tube will not occur. LTHS of pipe or tube materials is evaluated by stresses calculated for periods of 100,000 hours (11.43 years) and 50 years. LTHS tests can be performed at 20° C. according to PPI TR-3, ASTM D2837, ISO9080, and ASTM D1598 and ISO1167. ASTM 1598 and ISO1167 governs pipe specimen requirements, how to cut a pieces of pipe and how to pressurize the pieces to perform long term internal pressure test. ISO9080 and ASTM2837 govern how many pieces of specimens are needed, testing temperature, what kind of burst data distribution and projected strength is needed. PPI TR-3 specifies how many lots are required, reduced requirements of additional lots, validation and substantiation requirements, and additive change policies.

In some embodiments, a pipe or tube of the present disclosure can have an LTHS (50 years, 20° C.) of 8 MPa or greater, such as 9 MPa or greater, such as 10 MPa or greater, such as 11 MPa or greater, such as 8 MPa to 15 MPa, such as 10 MPa to 15 MPa, such as 11 MPa to 15 MPa, alternatively 10 MPa to 12 MPa, such as 11 MPa to 12 MPa. In some embodiments, a pipe or tube of the present disclosure can have an LTHS (100,000 hours, 20° C.) of 8 MPa or greater, such as 9 MPa or greater, such as 10 MPa or greater, such as 11 MPa or greater, such as 8 MPa to 15 MPa, such as 10 MPa to 15 MPa, such as 11 MPa to 15 MPa, alternatively 10 MPa to 12 MPa, such as 11 Mpa to 12 MPa.

The enhanced properties of the polyethylene compositions of the present disclosure are useful in a wide variety of applications, including transparent articles such as cook and storage ware, and in other articles such as furniture, automotive components, toys, sportswear, medical devices, sterilizable medical devices and sterilization containers, nonwoven fibers and fabrics and articles therefrom such as drapes, gowns, filters, hygiene products, diapers, and films, oriented films, sheets, tubes, pipes and other items where softness, high impact strength, and impact strength below freezing is important.

Additional examples of desirable articles of manufacture made from compositions of the present disclosure may include one or more of: films, sheets, fibers, woven and nonwoven fabrics, automotive components, furniture, sporting equipment, food storage containers, transparent and semi-transparent articles, toys, tubing and pipes, sheets, packaging, bags, sacks, coatings, caps, closures, crates, pallets, cups, non-food containers, pails, insulation, and/or medical devices. Further examples include automotive components, wire and cable jacketing, pipes, agricultural films, geomembranes, toys, sporting equipment, medical devices, casting and blowing of packaging films, extrusion of tubing, pipes and profiles, outdoor furniture (e.g. garden furniture), playground equipment, boat and water craft components, and other such articles. In particular, the compositions are suitable for automotive components such as bumpers, grills, trim parts, dashboards, instrument panels, exterior door and hood components, spoiler, wind screen, hub caps, mirror housing, body panel, protective side molding, and other interior and external components associated with automobiles, trucks, boats, and other vehicles.

Other useful articles and goods may include: crates, containers, packaging, labware, such as roller bottles for culture growth and media bottles, office floor mats, instrumentation sample holders and sample windows; liquid storage containers such as bags, pouches, and bottles for storage and IV infusion of blood or solutions; packaging material including those for medical devices or drugs including unit-dose or other blister or bubble pack as well as for wrapping or containing food preserved by irradiation. Other useful items include medical tubing and valves for any medical device including infusion kits, catheters, and respiratory therapy, as well as packaging materials for medical devices or food which is irradiated including trays, as well as stored liquid, such as water, milk, or juice containers including unit servings and bulk storage containers as well as transfer means such as tubing and pipes.

Retail films are commonly used for packaging and/or bundling articles for consumer use, such as, for example, in supermarket goods. Such films are typically formed in a single bubble blown extrusion process to a thickness of, for example, 10 to 80, μm.

Extrusion Coating

A polyethylene composition may be used in extrusion coating processes and applications. Extrusion coating is a plastic fabrication process in which molten polymer is extruded and applied onto a non-plastic support or substrate, such as paper or aluminum in order to obtain a multi-material complex structure. This complex structure typically combines toughness, sealing and resistance properties of the polymer formulation with barrier, stiffness or aesthetics attributes of the non-polymer substrate. In this process, the substrate is typically fed from a roll into a molten polymer as the polymer is extruded from a slot die, which is similar to a cast film process. The resultant structure is cooled, typically with a chill roll or rolls, and would into finished rolls. Extrusion coating materials are typically used in food and non-food packaging, pharmaceutical packaging, and manufacturing of goods for the construction (insulation elements) and photographic industries (paper).

Foamed Articles

The polymers and compositions described above may be used in foamed applications. In an extrusion foaming process, a blowing agent, such as, for example, carbon dioxide, nitrogen, or a compound that decomposes to form carbon dioxide or nitrogen, is injected into a polymer melt by means of a metering unit. The blowing agent is then dissolved in the polymer in an extruder, and pressure is maintained throughout the extruder. A rapid pressure drop rate upon exiting the extruder creates a foamed polymer having a homogenous cell structure. The resulting foamed product is typically light, strong, and suitable for use in a wide range of applications in industries such as packaging, automotive, aerospace, transportation, electric and electronics, and manufacturing.

Wire and Cable Applications

Also provided are electrical articles and devices including one or more layers formed of or comprising a polyethylene composition. Such devices include, for example, electronic cables, computer and computer-related equipment, marine cables, power cables, telecommunications cables or data transmission cables, and combined power/telecommunications cables.

Electrical devices can be formed by any suitable method, such as by one or more extrusion coating steps in a reactor/extruder equipped with a cable die. Such cable extrusion apparatus and processes are well known. In a typical extrusion method, an optionally heated conducting core is pulled through a heated extrusion die, typically a cross-head die, in which a layer of melted polymer composition is applied. Multiple layers can be applied by consecutive extrusion steps in which additional layers are added, or, with the proper type of die, multiple layers can be added simultaneously. The cable can be placed in a moisture curing environment, or allowed to cure under ambient conditions.

Additional Methods of Measurement

Small Angle Oscillatory Shear (SAOS): SAOS experiments can be performed at 190° C. using a 25 mm parallel plate configuration on an MCR501 rotational rheometer (Anton Paar GmbH). Sample test disks (25 mm diameter, 1.5 mm thickness) can be made with a Carver Laboratory press at 190° C. Samples were allowed to sit without pressure for approximately 3 minutes in order to melt and then held under pressure typically for 3 minutes to compression mold the sample. The disk sample was first equilibrated at 190° C. for about 10 minutes between the parallel plates in the rheometer to erase any prior thermal and crystallization history. An angular frequency sweep is next performed with a typical gap of 1.9 mm from 500 rad/s to 0.01 rad/s angular frequency using 5 points/decade and a strain value within the linear viscoelastic region determined from strain sweep experiments (see C. W. Macosko, Rheology Principles, Measurements and Applications, Wiley-VCH, New York, 1994). All experiments can be performed in a nitrogen atmosphere to minimize any degradation of the sample during the rheological testing.

From the storage (G') and loss (G") dynamic moduli (see C. W. Macosko, Rheology Principles, Measurements and Applications, Wiley-VCH, New York, 1994), the loss tangent (tan δ), where δ is the phase (loss) angle which is a measure of melt elasticity, is defined for each angular frequency as follows:

$$\tan \delta = G''/G'$$

EXAMPLES

Three inventive examples (IE1-3) made according to the present disclosure were compared to comparative examples CE1, CE2, CE3, and CE4, all of which are bimodal high density PE compositions with properties as reported in Table 1 below.

Table 1 illustrates polymer properties of examples CE1-CE4 and IE1-IE3. FIG. 1 is a graph illustrating SAOS rheology data for CE1-CE4 and IE1-IE3.

TABLE 1

| | CE1 | CE2 | CE3 | CE4 | IE1 | IE2 | IE3 |
|---|---|---|---|---|---|---|---|
| $MI_2$ | 0.05 | 0.08 | 0.07 | 0.04 | 0.04 | 0.06 | 0.06 |
| $MI_{21.6}$ | 7.84 | 10.50 | 9.47 | 7.29 | 7.12 | 8.32 | 9.16 |
| MIR | 157 | 131 | 135 | 182 | 178 | 139 | 153 |
| Density | 0.9607 | 0.955 | 0.9501 | 0.9493 | 0.9522 | 0.9518 | 0.9525 |
| Co-Monomer | C4 | C4 | C4 | C4 | C4 | C4 | C4 |
| Co-Monomer wt % | 0.94% | 0.70% | 1.30% | 0.90% | 1.01% | 1.05% | 0.97% |
| Mw | 294,206 | 226,982 | 294,142 | 336,551 | 320,873 | 313,333 | 303,309 |
| Mn | 9,125 | 10,235 | 9,915 | 11,544 | 10,298 | 11,579 | 11,415 |
| Mz | 1,902,669 | 1,358,438 | 1,860,101 | 2,086,856 | 1,958,106 | 1,920,973 | 1,850,311 |
| Mz + 1 | 3,722,429 | 2,888,951 | 3,600,340 | 3,800,121 | 3,672,548 | 3,633,008 | 3,550,230 |
| Mw/Mn | 32.2 | 22.2 | 29.7 | 29.2 | 31.2 | 27.1 | 26.6 |
| Mz/Mw | 6.5 | 6.0 | 6.3 | 6.2 | 6.1 | 6.1 | 6.1 |
| g' | 0.864 | 0.77 | 0.657 | 0.819 | 0.758 | 0.73 | 0.72 |
| K factor | 0.47 | 0.13 | 0.47 | 0.51 | 0.37 | 0.34 | 0.33 |
| Complex viscosity at 628 rad/s | 688 | 616 | 552 | 654 | 579 | 553 | 562 |
| ZSV (Pa* s) | 321,848 | 244,955 | 300,850 | 399,623 | 340,085 | 266,916 | 261,745 |
| V index | 7.46 | 9.57 | 7.82 | 7.49 | 6.34 | 5.94 | 6.62 |

Table 2 illustrates polymer properties of examples IE1-IE3 as well as IE1-IE3 each with 2.3 wt % carbon black. As shown in Table 2, polyethylene compositions of the present disclosure may include additives without sacrificing advantageous properties.

TABLE 2

| | IE1 | IE2 | IE3 | IE1 with 2.3% carbon black | IE2 with 2.3% carbon black | IE3 with 2.3% carbon black |
|---|---|---|---|---|---|---|
| Yield Strength [MPa] | 25.5 | 24.9 | 25.4 | 25.2 | 25.3 | 25.7 |
| Elongation at Yield (%) | 8.9 | 9.3 | 9.2 | 9.0 | 8.9 | 8.8 |
| Tensile Strength [MPa] | 39.9 | 36.7 | 38.6 | 36.1 | 35.3 | 36.8 |
| Flex 2% Secant Modulus (MPa) | 1034 | 1041 | 1062 | 1069 | 1110 | 1041 |
| Max Flex Stress (MPa) | 27.4 | 26.7 | 27.3 | 28.0 | 27.7 | 29.2 |
| Charpy 23 C., (KJ/m²) | 24.5 | 21.8 | 20.6 | 22.7 | 20.8 | 21.0 |
| NCLS, 800 psi(hrs) | >1000 | >1000 | >1000 | >1000 | >1000 | >1000 |
| PENT (hrs) | >3000 | n/a | >500 | >3000 | n/a | >500 |

Applications

Figure 2:
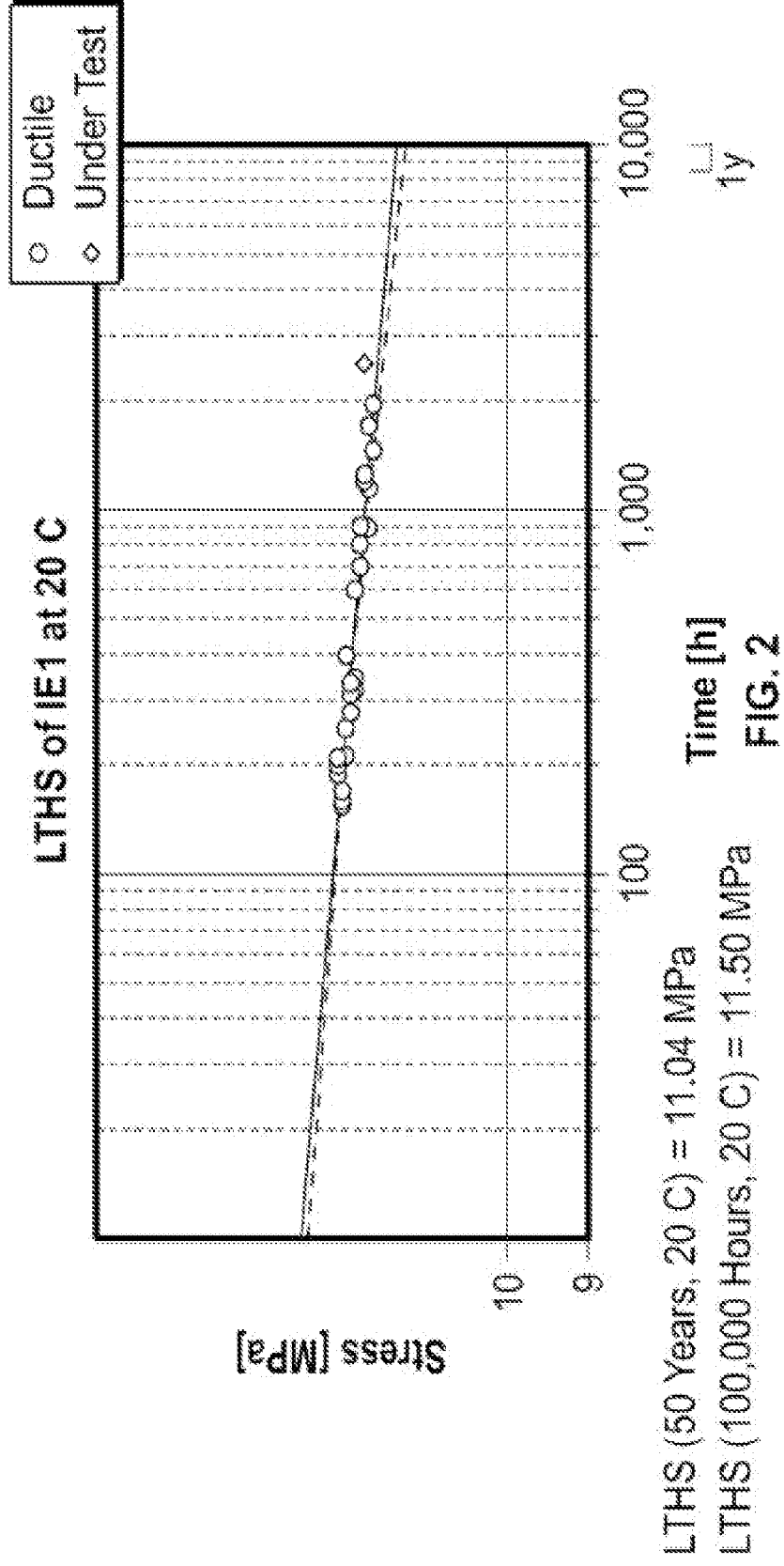
FIG. 2 is a graph illustrating LTHS (long term hydrostatic strength) of a pipe formed by example IE1 at 20° C., according to an embodiment.
Figure 3:
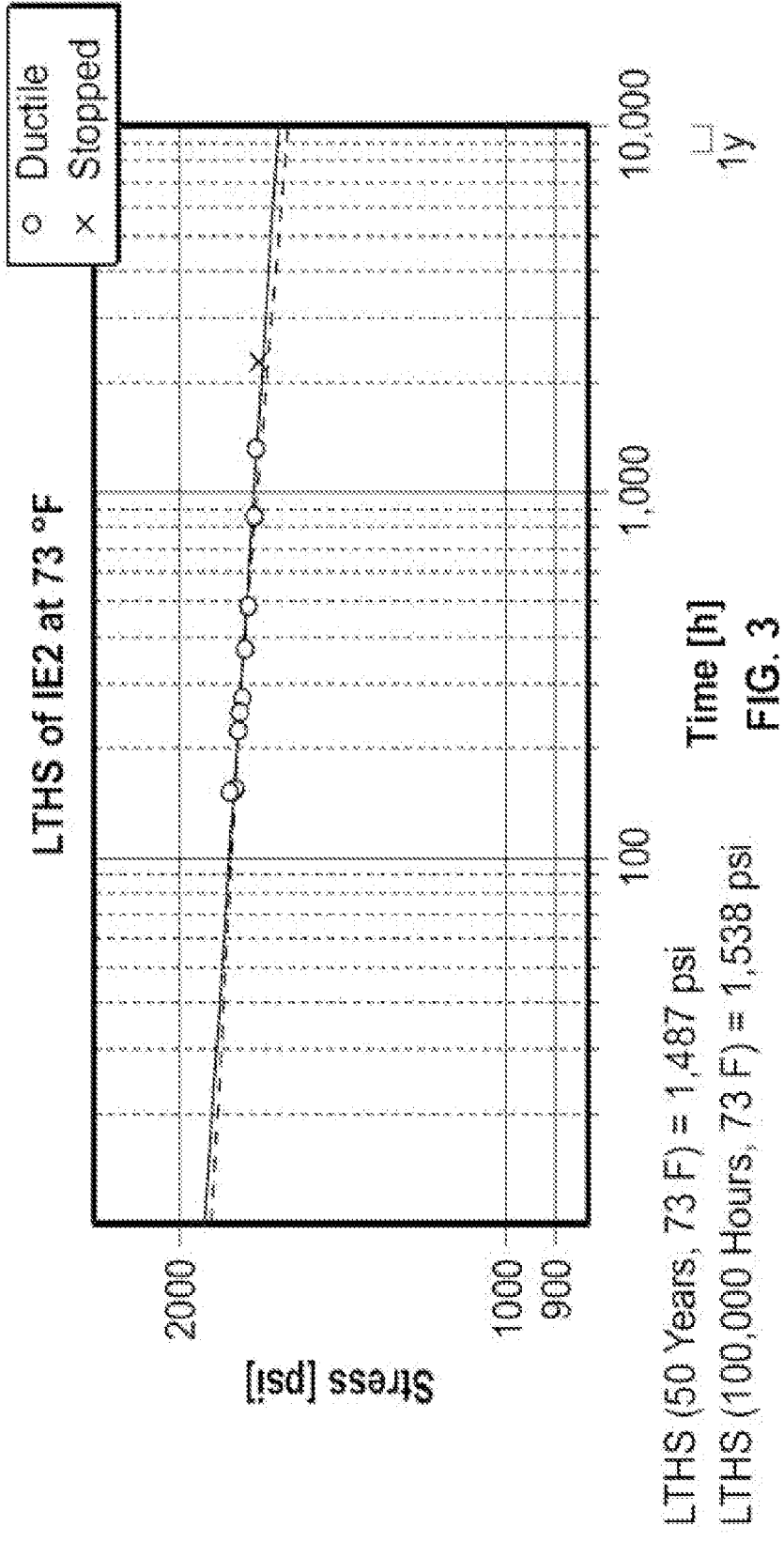
FIG. 3 is a graph illustrating LTHS of a pipe formed by example 1E2 at 73° F., according to an embodiment.

The inventive examples were extruded into pipes using a Davis Standard pipe extruders with 6.5 wt % of carbon black master batch with 35 wt % carbon black loading in 65% carrier. The extruder was equipped with a 75 mm screw and a groove barrel. The zone temperatures ranged from 375° F. to 400° F., die temperatures were ranged from 375° F. to 390° F. The screw RPM was about 90 and line speed about 17 feet/min. The extruded pipe had good appearance inside/outside and good roundness. The transition between different inventive samples, and between inventive samples and comparative examples was straightforward. At the same RPM, all the inventive examples had about 5% output increase at similar energy consumption compared with CE4. Iron pipe size (IPS) standard dimension ratio (SDR) 11 pipes with 2 inch nominal outside diameter were produced. Hydrostatic tests of pipe specimens were performed, some data were included in Table 3. Results meet the mechanical strength requirement set by table 4 of ISO4437-2, Plastics piping systems for the supply of gaseous fuels—Polyethylene (PE) Part 2: Pipes. FIG. 2 is a graph illustrating LTHS of a pipe formed from example IE1 at 20° C. FIG. 3 is a graph illustrating LTHS of a pipe formed from example 1E2 at 73° F.

TABLE 3

| Testing condition | ISO4437 Requirement | IE1 results (20° C.) | IE2 results (73° F.) | IE3 results |
|---|---|---|---|---|
| 12 MPa Hoop stress | 100 hrs | 1250 hrs (Type A) | 374 hrs (Type A) | N/A |

Overall, polyethylene compositions of the present disclosure provide an improved combination of processing and mechanical properties over conventional polymers. For example, polyethylene compositions of the present disclosure can provide improved complex viscosity, K factor, and V index, as compared to conventional HDPEs. In addition, polyethylene compositions of the present disclosure can exhibit excellent SCR, demonstrated by, for example, NCLS test performance. These properties make the compositions particularly useful for film, pipe, and blow molding applications and can provide lightweight of such articles, reducing material consumption and costs.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A polyethylene composition comprising:
98.5 wt % to 99.5 wt % ethylene content, and 1.5 wt % to 0.5 wt % a C3 to C5 α-olefin comonomer content, each based on the ethylene content plus the C3 to C5 α-olefin comonomer content; the polyethylene composition having:
an Mw/Mn of 26 to 32;
a density of 0.93 g/cm3 to 0.97 g/cm.sup.3;
a complex viscosity (at 628 rad/s, 190° C.) of 600 Pa*s or less;
a Cross model zero shear viscosity of 150,000 Pa*s to 350,000 Pa*s;
a V index of less than 7;

a weight average molecular weight (Mw) of 300,000 g/mol to 320,000 g/mol;
a number average molecular weight (Mn) of 10,000 g/mol to 12,000 g/mol;
a Z-average molecular weight (Mz) of 1,800,000 g/mol to 1,960,000 g/mol;
Mz/Mw of 6 to 6.5;
g' of 0.7 to 0.76;
melt index (I2) of 0.04 g/10 min to 0.06 g/10 min;
a high load meld index (I21) of 7 g/10 min to 10 g/10 min; and
a melt index ratio (MIR) of 135 to 180.

2. The polyethylene composition of claim 1, wherein the polyethylene composition has the density of 0.945 g/cm$^3$ to 0.955 g/cm$^3$.

3. The polyethylene composition of claim 1, wherein the polyethylene composition has one or more of the following properties:
(j) the complex viscosity (at 628 rad/s, 190° C.) of 525 Pa*s to 575 Pa*s;
(k) the Cross model zero shear viscosity (at 190° C.) of 180,000 Pa*s to 350,000 Pa*s;
(l) Notched Constant Ligament-Stress (NCLS) value of greater than 800 hours;
(m) K factor of 0.2 to 0.5; and
(n) the V index of −30 to 0.

4. The polyethylene composition of claim 3, having all of the properties (j)-(n).

5. The polyethylene composition of claim 3, having the NCLS value of greater than 1500 hours.

6. The polyethylene composition of claim 3, having the Cross model zero shear viscosity (at 190° C.) of 200,000 Pa*s to 275,000 Pa*s.

7. The polyethylene composition of claim 3, having the Cross model zero shear viscosity (at 190° C.) of 300,000 Pa*s to 350,000 Pa*s.

8. The polyethylene composition of claim 1, wherein the polyethylene composition has a multimodal molecular weight distribution.

9. The polyethylene composition of claim 8, wherein the polyethylene composition comprises:
a low molecular weight fraction (LMWF) having a GPC average molecular weight distribution with an Mw value of 10,000 g/mol to about 100,000 g/mol, a Mn value of 3,000 g/mol to about 10,000 g/mol, a Mz value of about 200,000 g/mol to about 800,000 g/mol, Mw/Mn of 4.0 to 12.0, and a density of about 0.930 g/cm.sup.3 to about 0.980 g/cm.sup.3; and
a high molecular weight fraction (HMWF).

10. The polyethylene composition of claim 9, wherein the LMWF has the Mw/Mn of 5 to 10, the Mn value of 3,000 g/mol to about 10,000 g/mol, and the Mz value greater than 300,000 g/mol to about 800,000 g/mol.

11. The polyethylene composition of claim 9, wherein the LMWF comprises 49 wt % to 51 wt % of the polyethylene composition and the HMWF comprises 51 wt % to 49 wt % of the polyethylene composition, based on the total of the HMWF+LMWF where the total of the HMWF+LMWF does not exceed 100%.

12. The polyethylene composition of claim 9, wherein the HMWF has a lower density than the LMWF.

13. A pipe comprising the polyethylene composition of claim 1, wherein the pipe has one or both of the following properties: (i) a slow crack growth of 3,000 hours or greater;

and (ii) a long term hydrostatic strength (LTHS) (1000,000 hours, 20° C.) of 10 MPa to 12 MPa.

\* \* \* \* \*